Dec. 8, 1959                     E. E. SHELBY                  2,915,995
                                  SLIP TILLER
Filed April 4, 1957                                        3 Sheets-Sheet 1
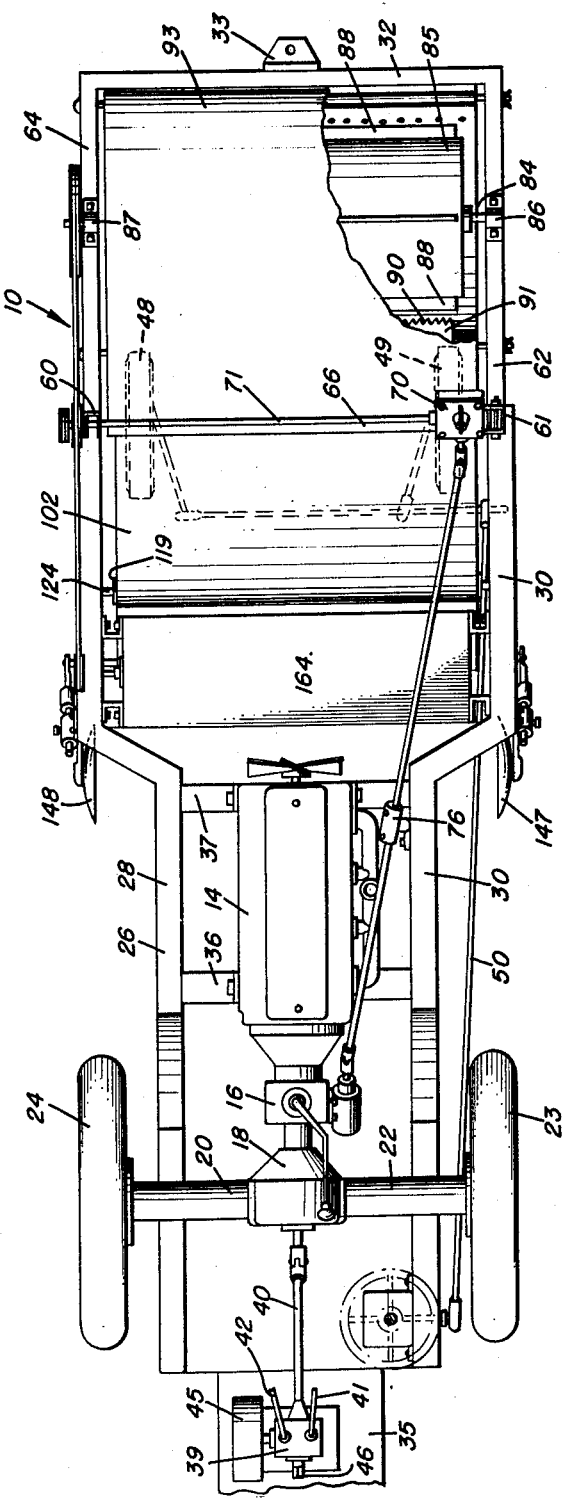
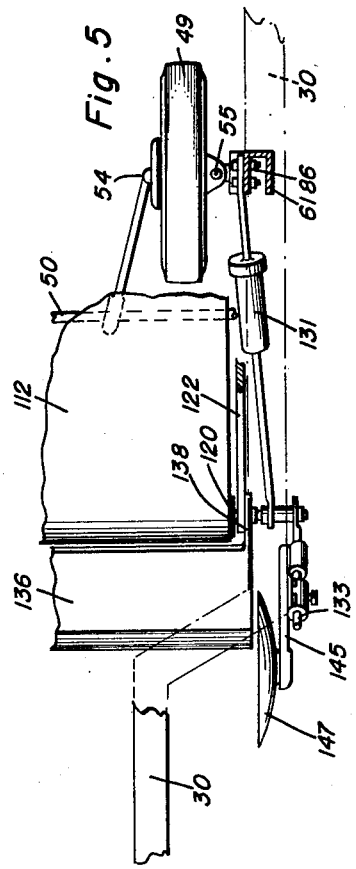
Earl E. Shelby
    INVENTOR.
BY

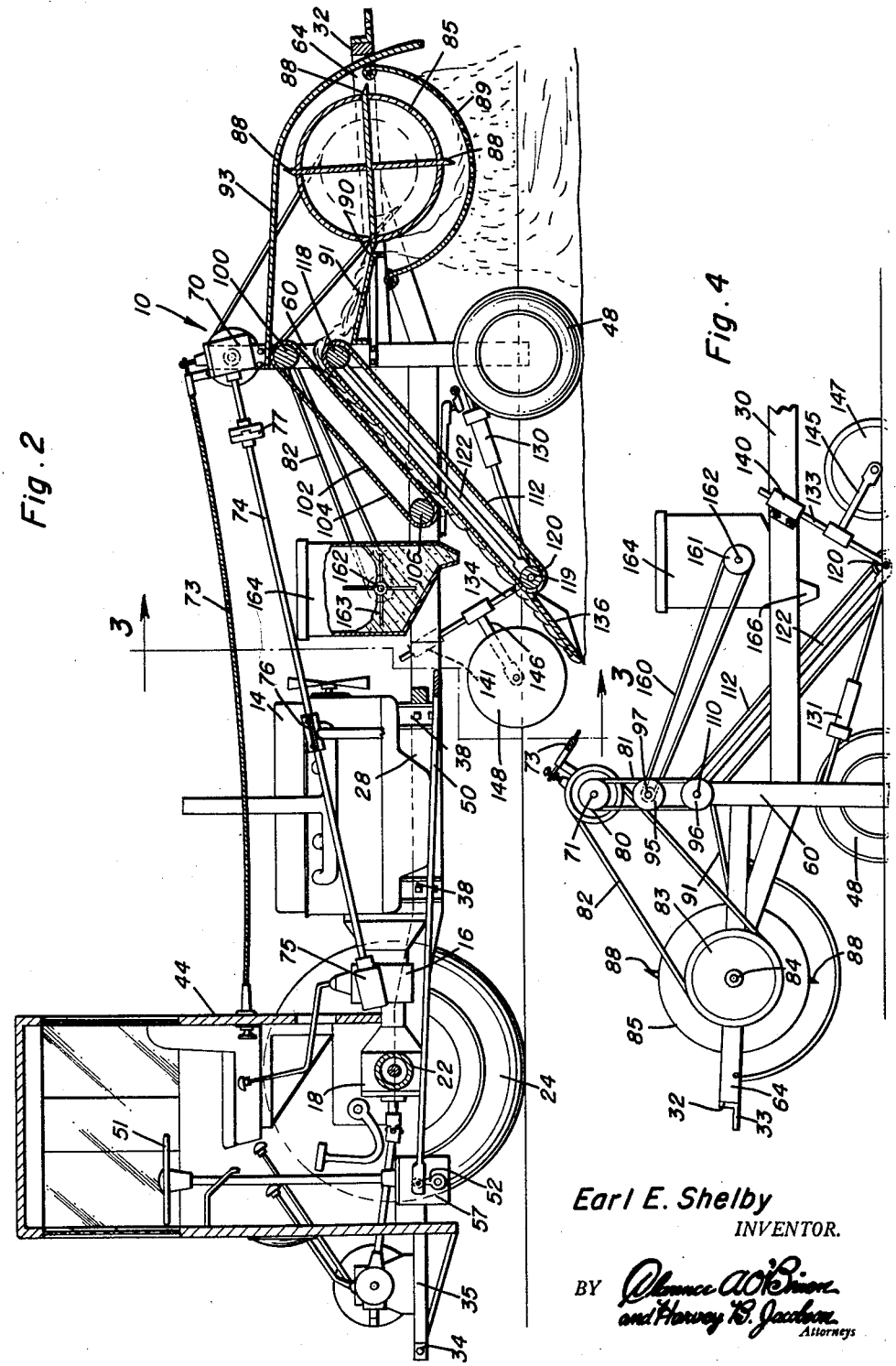

Dec. 8, 1959  E. E. SHELBY  2,915,995
SLIP TILLER
Filed April 4, 1957  3 Sheets-Sheet 3
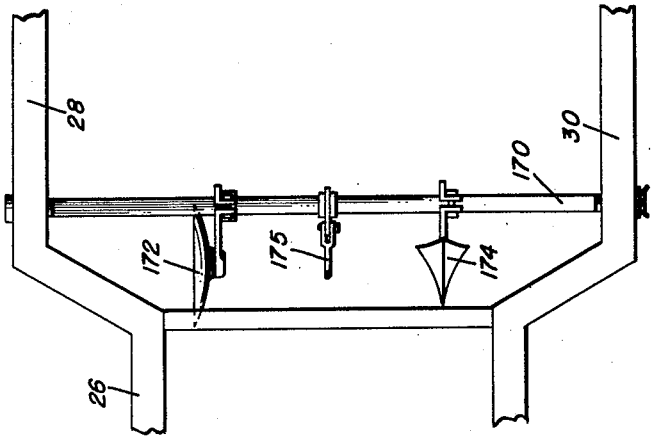
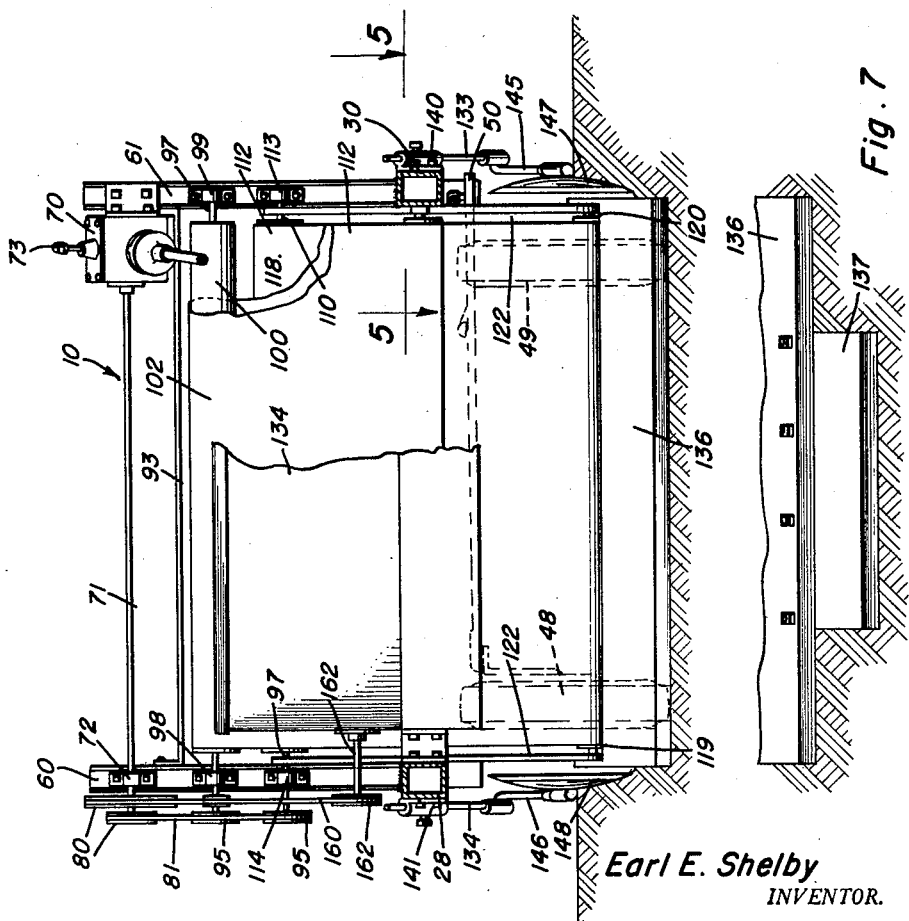
Earl E. Shelby
INVENTOR.
BY *Clarence A. O'Brien*
*and Harvey B. Jacobson*
Attorneys

United States Patent Office 2,915,995
Patented Dec. 8, 1959

2,915,995

SLIP TILLER

Earl E. Shelby, Silver City, Iowa

Application April 4, 1957, Serial No. 650,754

2 Claims. (Cl. 111—10)

This invention relates to agricultural implements and more particularly to a slip tiller.

An object of the present invention is to provide a tiller for the soil which enables a much more effective and complete cultivating in a field which has a spent crop therein. The space between old corn rows becomes packed down during cultivating and picking. The result is that a subsequent crop in the same field will suffer unless an excellent tilling job is done and moreover, it is advisable to fertilize at the same time. The reason is that the compacted soil fails to release as much nitrogen as the loose soil which was formerly in the rows of corn. The "loose" soil is considered to be "loose" in comparison to that which is compacted between the rows of corn.

Therefore, it is a further object of the present invention to provide a special agricultural implement to care for this problem, the implement having a particular arrangement of earth working tools in order to till the soil in a field and at the same time apply fertilizer to the soil as it is being worked.

A further object of the invention is to provide an agricultural implement of the self-propelled type wherein there are provision for a selection of tools, but which features a conveyor which is adapted to elevate at least some of the soil and while being elevated apply fertilizer into the soil, thoroughly mix the same and then discharge it from the approximate place that it had been removed from. When used as a planter, it is within the purview of the invention to apply seed to the soil in addition to or in the place of the fertilizer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary top plan view with parts being omitted, illustrating the general organization of an agricultural implement which is constructed in accordance with the invention;

Figure 2 is a longitudinal sectional view of an implement constructed to show the principles of the invention;

Figure 3 is an enlarged transverse sectional view taken on the line 3—3 of Figure 2 with parts broken away;

Figure 4 is a fragmentary elevational view to show the inner action between various drives for the parts of the agricultural implement;

Figure 5 is a fragmentary top plan view of a part of the implement, showing principally a suggested manner for suspending the steerable wheels of the vehicle;

Figure 6 is a fragmentary elevational top plan view of a toolbar that is provided with but two of a numerous variety of tools that could be supported on it; and Figure 7 is a fragmentary elevational view showing an extension blade bolted on the main blade of the machine for the purpose of going deeper under corn rows to hold water and some soil from washing.

In the accompanying drawings there is an agricultural implement 10 which is constructed in accordance with the principles of the invention. The implement is of the self-propelled type and therefore, there is an engine 14, transmission 16, differential housing 18 and axle housings 20 and 22 protruding laterally therefrom. Drive wheels 23 and 24 are on axles in axle housings 20 and 22, these drive wheels being fitted with cleats, as on agricultural tires. The frame 26 of the vehicle is made of side rails or members 28 and 30 that are connected together by means of transverse braces at various intervals and by a rear cross member 32. Rear draw bar 33 to which a seeder or planter is attachable, is on rear cross member 32, while front draw bar 34 is on the frontal extremity of a small platform 35. Cross members 36 and 37 are used to support the motor mounts 38 of the engine 14. A front gear box 39 is mounted on the small platform 35 and is drivingly connected as by shafting 40, to the differential in the differential case 18. Speed control levers 41 and 42 extend from gear box 39 and terminate conveniently within the cab 44 on the narrower front part of the frame 26. Power takeoff pulley 45 at one side of gear box 39 schematically represents any type of means to couple with the front power takeoff. Another means to serve this purpose is represented at 46 where there is a short shaft protruding from gear box 39. Such conventional, ordinary necessities for the motor vehicle, as brakes, are only schematically represented. Other things that fall within this category are instruments, if any, fuel tank and complete electrical system.

The rear wheels 48 and 49 are capable of being steered by a steering linkage 50. Steering wheel 51 is in cab 44 and is connected with a steering column while the latter drivingly connects with steering box 51 that houses a worm and sector to operate steering arm 52. Steering linkage 50 is connected to steering arm 52. Linkage 50 is connected with the wheel spindles, as spindle 54 (Figure 5) to steer the same about the vertical kingpin 55. This kingpin is mounted on a support 56 that is bolted or otherwise secured to frame member 30. An identical steering arrangement is provided for wheel 48.

As seen by comparison with Figures 1 and 2, the rear part of frame 26 is of special construction in order to accommodate some of the working parts of the agricultural implement. There are vertical uprights 60 and 61 whose lower extremities accommodate the wheel spindles and kingpins for the rear wheels 48 and 49. The frame members 30 and 28 have upwardly offset portions made by members 62 and 64 that are welded or otherwise attached to and braced on the uprights 60 and 61. One or more transverse braces 66 extend between the uprights 60 and 61. A gear transfer mechanism 70 is attached at the top of post 61 and has a driven shaft 71 secured thereto and extending transversely across frame 26 to a bearing 72 on upright 60. A Bowden wire 73 extends from the control lever of the gear transfer mechanism 70 and terminates at a convenient place in the cab 44. This is for control of the gear transfer mechanism from within the cab or from a location adjacent to the cab in those instances wherein no enclosure is necessary. Power shaft 74 driven by power takeoff 75 from transmission 16, drives the gear transfer mechanism 70. An intermediate bearing 76 reduces or prevents whip in power shaft 74 and overriding clutch 77 in shaft 74 prevents damage to the various parts in the power train should an obstruction be met in the use of the agricultural implement.

Figure 4 shows an application of the power from three speed gear box 70 and driven shaft 71. The purpose of gear box 70 is to provide for various speeds of mulching or soil working. Belt pulley 80 is attached to the outer end of driven shaft 71 and has two chains or belts 81 and 82 engaged with it. Belt 82 is engaged with pulley 83, the latter being fixed to a transverse drum supporting shaft 84 or a pair of spindles welded or otherwise secured to drum 85. The spindles or shaft 84 are mounted in bearings 86 and 87 on the rearwardly extending frame members 62 and 64 (Figure 1), this being the disposition of the mulching drum. It is made of a cylinder with a number of cutting blades 88 extending across it and coacting with the stationary but adjustable, cutting blade 90 formed at the outer end of apron 91. Cutting edge 90 is preferably toothed (Figure 1) while the blades 88 are straight in order to prevent windrowing of the soil as it flows over the apron 91. Sheet metal guard or hood 93 is welded to the uprights 60 and 61 and to the rear cross member 32. Should it be desirable to have the hood removable, it may be attached in some way other than welding. Removably mounted screen or grate 89 coacting with the mulching drum further aids in complete mulching and soil working operations.

Belt 81 is drivingly connected to pulley 80 and to the pulleys 95 and 96 respectively. Pulley 95 is on a shaft 97 that extends transversely across the frame 26 and is mounted in bearings 98 and 99 on the uprights 60 and 61. Conveyor roller 100 is adhered to or otherwise operatively connected with shaft 97 (Figure 2) and it has a conveyor 104 that uses conveyor belt 102, is entrained over an idler roller 106. This idler roller is carried by bearings in the frame members 28 and 30 in advance of the rear wheels 48 and 49.

Pulley 96 is attached to shaft 110 and this shaft constitutes a part of another endless conveyor 112 and is mounted for rotation in bearings 113 and 114 on uprights 60 and 61. Upper conveyor roller 118 is connected with shaft 110 and has the endless conveyor belts 112 entrained around it. This belt is also entrained around an idler roller 119 on shaft 120 at the lower extremity of this endless conveyor. A rigid spacer frame 122 extends between shafts 110 and 124 on which the lower 120 is supported. Rigid frame 122 may be constructed of two arms having holes at their ends through which the shafts 120 and 110 pass. Bracing between the arms may be attached rigidly in place or omitted, as desired.

The lower end of the conveyor 112 is adjustable by means of the two hydraulic cylinders 130 and 131. Support rods and piston rods protrude from the opposite ends of the cylinders 130 and 131 and are attached pivotally to the shaft 120 and attached to the lower extremities of the uprights 60 and 61. Rods 133 and 134 have their lower extremities pivoted to shaft 120 on opposite sides of blade 136. The blade has ears as at 138 (Figure 5) that are formed with holes through which shaft 120 passes, the ears being fixed to the shaft. Accordingly, blade 136, together with extension blade 137 when used, are adjusted by hydraulic cylinders 130 and 131. Rods 133 and 134 are mounted on shaft 120 and pass through a pair of sleeve bearings 140 and 141 secured to frame members 30 and 28 respectively. Rods 133 and 134 have disk colter supporting arms 145 and 146 with colter disks 147 and 148 carried thereby. The disk colters are at the sides of the blade 136 and cooperate with the blade to form neat cuts of rectangular formation in the soil. By virtue of the described construction, actuation of cylinders 130 and 131 will cause the endless conveyor 112, blade 132 and the colter disks 148 and 147 to be vertically adjusted.

Shaft 97 has a pulley in addition to pulley 95, fixed thereto. Endless belt 160 is entrained around this additional pulley and around the pulley 161 on the paddle wheel shaft 162. A paddle wheel 163 on shaft 162 is disposed in a hopper 164. The hopper has its discharge spout 166 spaced vertically over the lower extremity of the endless conveyor 112 and in advance of the shorter conveyor 104. The hopper 164 contains fertilizer and/ or lime that is admixed with the soil picked up by blade 136 and carried by the two conveyors which are superposed with respect to each other. As shown in Figure 2 the soil then travels over the discharge end of conveyor 112 and onto the apron 91. Here the soil flows rearwardly between the knife edge 90 and the blade of the mulching drum 85. Thereafter the soil, now thoroughly mixed with fertilizer, mulch, etc. is redeposited.

There is ample provision for a plurality of tool bars throughout the length of the implement. One such tool bar 170 (Fig. 6) is illustrated. It contains a colter disk 172 and a sweep 174, and means 175 to operate the tool bar. These are mere schematic representations of various standard earth working tools, but the disposition of the tools on the tool bar 170 is of importance. They should be so located that they work between rows of corn while the main blade 136 cultivates two rows of corn stalks and the space between the two rows. This is to make certain that fertilizer is applied where most needed for subsequent crops and to make certain that the space between the rows of corn is thoroughly cultivated to enable the soil to free enough nitrogen to feed the subsequent crop.

The forgoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An agricultural implement comprising a wheeled frame, means on said frame for propelling the same, a first endless conveyor mounted at one end on said frame and extending therefrom in downwardly forwardly inclined relation, a cutter attached to the lower end of said conveyor forming a continuation of the upper flight of said endless conveyor and adapted to dig into and scoop up a layer of soil as said frame is propelled to direct the same onto said endless conveyor, a second endless conveyor mounted on said frame substantially parallel to the first mentioned conveyor with the lower flight thereof spaced from the upper flight of the first conveyor to sandwich a layer of soil therebetween, said second conveyor overlying only the upper portion of said first conveyor so as to leave a substantial extent of the lower portion of the first conveyor free and unobstructed from above, a hopper mounted on said frame directly above said free and unobstructed portion of the first conveyor for delivering material onto a layer of soil supported on such free and unobstructed first conveyor portion, an apron mounted on said frame adjacent the upper, discharge end of said first conveyor and disposed therebelow so that material will fall and tumble from said first conveyor onto said apron and will be admixed in so doing, said apron angled downwardly from said first conveyor and terminating remote therefrom in a free edge portion, and a rotary drum mulcher operatively carried by said frame and said mulcher having blades thereon coacting with said free edge of the apron to direct soil and material admixed therewith downwardly while mulching the same.

2. The assembly as defined in and by claim 1 wherein the upper end of said first conveyor is pivotally attached to said frame, a pair of bearing elements secured to said frame, a pair of guide rods having their lower ends pivotally attached to said lower end of said first conveyor and extending upwardly therefrom and slidably received within said bearing elements affixed to said frame, means extending between said frame and said first conveyor for pivoting the same about its upper end relative to said frame, and side earth working tools connected to said rods for vertical movement therwith and with said first conveyor to form side cuts in the soil as said cutter digs the soil in response to forward movement of the frame.

References Cited in the file of this patent

UNITED STATES PATENTS

| | | |
|---|---|---|
| 971,990 | Grantham | Oct. 4, 1910 |
| 1,282,124 | Phillips | Oct. 22, 1918 |
| 1,676,233 | Doroski | July 3, 1928 |
| 1,761,286 | Zuckerman | June 3, 1930 |
| 1,771,025 | Barry | July 22, 1930 |
| 1,802,536 | Romera | Apr. 28, 1931 |
| 2,060,688 | Pryor et al. | Nov. 10, 1936 |
| 2,401,653 | Mohler | June 4, 1946 |
| 2,524,871 | Andrus | Oct. 10, 1950 |

FOREIGN PATENTS

| | | |
|---|---|---|
| 143,042 | Australia | Aug. 23, 1951 |